United States Patent [19]

Rabe

[11] Patent Number: 4,763,053
[45] Date of Patent: Aug. 9, 1988

[54] ELECTRONICALLY COMMUTATED DC MACHINE AND USE THEREOF

[76] Inventor: Erich Rabe, Auf der Schanz 44, 8500 Nürnberg 14, Fed. Rep. of Germany

[21] Appl. No.: 739,091

[22] Filed: May 31, 1985

[30] Foreign Application Priority Data

Sep. 13, 1984 [DE] Fed. Rep. of Germany ....... 3433695
May 3, 1985 [DE] Fed. Rep. of Germany ....... 3515987

[51] Int. Cl.⁴ .................... H02K 29/08; H02K 3/00
[52] U.S. Cl. ................................. 318/254; 310/180
[58] Field of Search ............ 310/180, 184, 198, 201, 310/DIG. 6, 68 R; 318/138, 254 A, 254, 439

[56] References Cited

U.S. PATENT DOCUMENTS

| | | | |
|---|---|---|---|
| 3,034,005 | 5/1962 | Carr | 310/198 X |
| 3,096,455 | 7/1963 | Hahn | 310/DIG. 6 X |
| 3,377,534 | 4/1968 | Hill | 318/138 |
| 3,564,306 | 2/1971 | Ott et al. | 310/10 |
| 3,569,753 | 3/1971 | Babikyan | 310/68 |
| 4,187,453 | 2/1980 | Rough | 318/135 |
| 4,228,384 | 10/1980 | Arnold, Jr. et al. | 318/254 |
| 4,303,210 | 12/1981 | Fujita et al. | 242/200 |
| 4,376,261 | 3/1983 | von der Heide et al. | 318/254 |
| 4,388,547 | 6/1983 | Gruber | 310/68 R X |
| 4,501,986 | 2/1985 | Gheorghe | 310/201 X |

FOREIGN PATENT DOCUMENTS

| | | | |
|---|---|---|---|
| 55-83449 | 6/1980 | Japan . | |
| 56-62062 | 5/1981 | Japan | 318/254 |
| 56-91670 | 7/1981 | Japan | 318/254 |
| 58-89054 | 5/1983 | Japan . | |
| WO85/01158 | 3/1985 | PCT Int'l Appl. . | |
| 1157805 | 7/1969 | United Kingdom . | |
| 1423866 | 2/1976 | United Kingdom | 310/DIG. 6 |
| 1598122 | 9/1981 | United Kingdom . | |
| 0584394 | 12/1977 | U.S.S.R. | 310/184 |

OTHER PUBLICATIONS

Electronic Design, "Printed Circuit Armature Now in DC Motor", Mar. 4, 1959.

Primary Examiner—Bentsu Ro
Attorney, Agent, or Firm—Leydig, Voit & Mayer

[57] ABSTRACT

The rotor of an electronically commutated DC machine, which may be operated in the motor mode or in the generator mode, comprises at least one permanent magnet having at least four poles disposed concentrically to the rotary axis of the rotor, said poles being polarized substantially normal to said axis of rotation and being disposed adjacent an annular return circuit member. The stator winding is arranged in the annular gap between rotor and return circuit members and comprises a meander-like conductive strip array whose linear forward or backward extending meander sections consist of a number of parallel conductor sections. Means for detecting the angular position of the rotor relative to the linear forward and backward extending meander sections supplies signals to an electronic control system which in turn controls the flow of current through the conductive strip array such that the latter produces a magnetic field to drive the rotor. An electronically commutated DC motor of such structure and including, for instance, 40 poles exhibits an extremely constant rated motor speed and by virtue of the high space factor in the magnetic gap produces a high e.m.f. Such a motor may preferably be used as driving unit in Winchester disk storages.

27 Claims, 8 Drawing Sheets

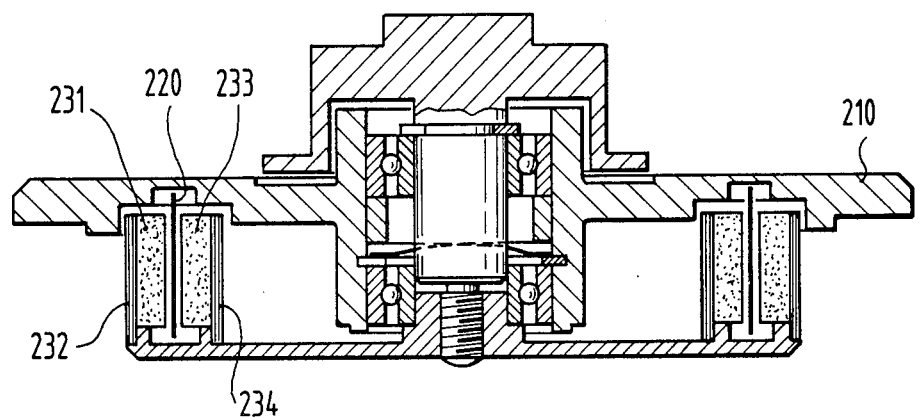
FIG. 4
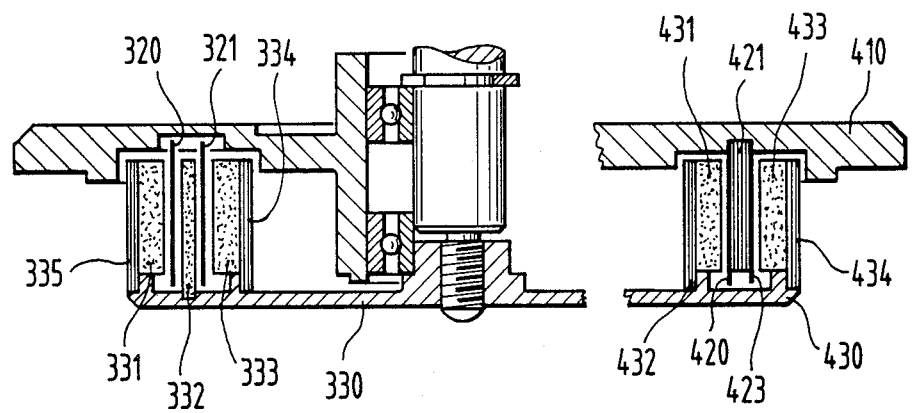
FIG. 5A
FIG. 5B

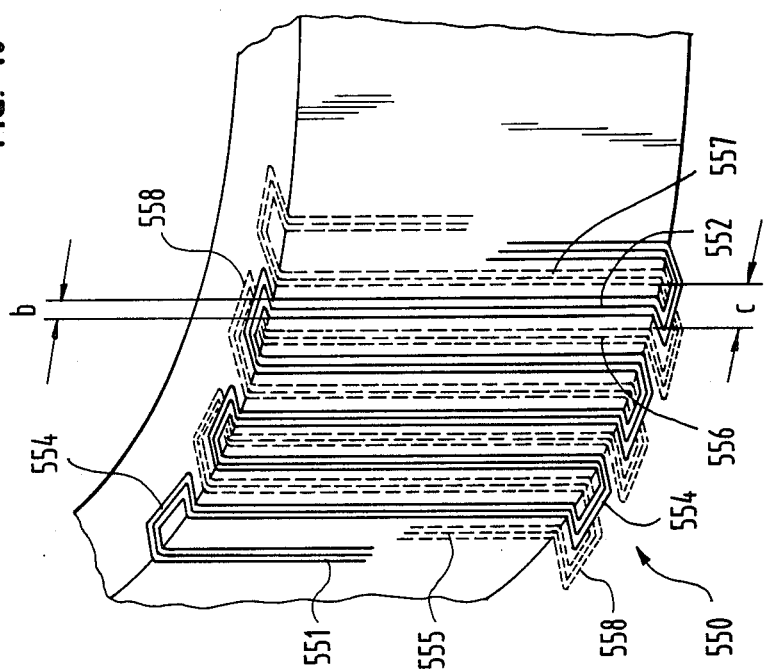
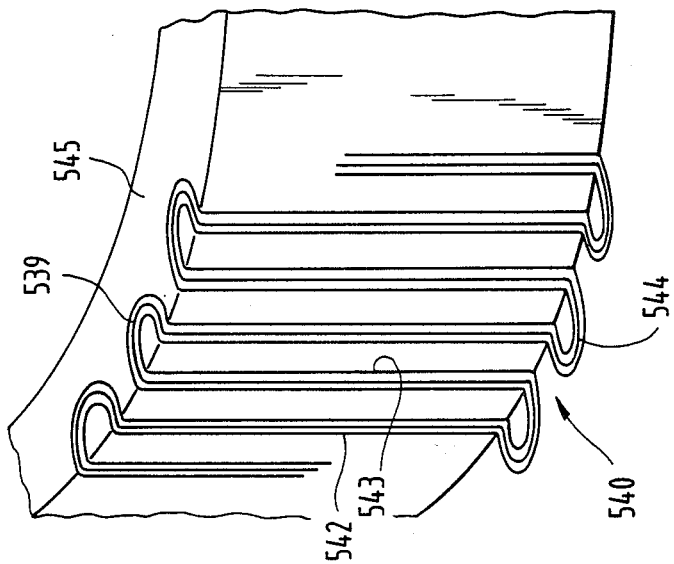

ELECTRONICALLY COMMUTATED DC MACHINE AND USE THEREOF

SUMMARY OF THE INVENTION

The invention is directed to an electronically commutated DC machine. The invention furthermore is directed to preferred uses of said machine.

The DC machine may be used both as DC motor and as generator. Below, the machine is described with particular reference to its use as a motor in the form of an electronically commutated multi-pole DC motor, but this is not intended as a limitation of the invention.

More in detail, the invention is directed to an electronically commutated DC machine, comprising a rotor having at least one permanent magnet including at least four poles disposed in concentric relationship to the rotary axis of the rotor and polarized essentially perpendicularly thereto, adjacent an annular magnetic circuit member, further comprising at least one fixed meander-like conductive strip array in the annular gap between rotor and magnetic circuit member, further comprising means for detecting the angular position of the rotor relative to the linear, forward or backward extending meander sections of the conductive strip array, and comprising an electronic control system for controlling the flow of current through the conductive strip array in response to the signals produced by the detecting means such that the conductive strip array produces a magnetic field to drive the rotor.

An electronically commutated DC motor of this type has been known from the German laid-open application No. 1,613,380. The stator winding of the known motor is implemented as a printed circuit on a substrate and consists exclusively—based on one major surface of the substrate—of a single winding of a single, meander-like extending conductor. Although it is specified that this structure of the conductive strip array "ensures the best possible utilization of copper", such a motor having the known meander-like conductive strip array supplies merely a relatively low torque, because the drivingly active magnetic air gap is predominantly filled with magnetically inert materials, i.e. the substrate material for the printed circuit and/or air.

In view of the above structure it is the object of the instant invention to provide an electronically commutated DC machine of this kind, which furthermore ensures the advantages of the multi-pole configuration of a permanent magnet rotor and the stator winding array within a narrow, cylindrical magnetic air gap, such as high uniformity of torque distribution about the circumference in response to the angle of rotation in the motor mode, or a high linear relationship between rotary speed and amplitude of the generated a.c. voltage in the generator mode, as well as minimum magnetic leakage and armature reaction, while this DC machine additionally has a substantially enhanced efficiency.

It is a further object of the instant invention to provide a DC machine of this kind in the form of an electronically commutated DC motor which, as compared to conventional electronically commutated DC motors with a permanent magnetic rotor of conventional magnetic materials such as ferrites, produces a higher torque while requiring the same amount of space.

It is a further object of the instant invention to provide an electronically commutated DC machine of this kind, the electronic control system thereof being accommodated with economy of space and without emitting any radio interference to the outside.

It is a still further object of the instant invention to provide a DC machine of this kind in the form of an electronically commutated DC motor which includes only a small number of separate components which may be manufactured and assembled by techniques adapted to industrial-scale manufacture to result in a motor which within the scope of manufacturing tolerances exhibits high accuracy in respect of the mechanically specified dimensions.

In this respect the rotor of the motor may be integrally formed with a disk turntable, and the distance of the plane of this disk turntable relative to a reference plane of the motor shall be adjustable to an accuracy of a few micrometers.

Further objects, purposes, particularities and advantages of the invention will become apparent from a study of the following description with reference to the drawings.

Proceeding from an electronically commutated DC machine having the above-mentioned features, the solution of said object and purposes in accordance with the invention is characterized in that each linear forward or backward extending meander section of the meander-like conductive strip array consists of a number of parallel conductor sections.

In accordance with one aspect of the invention this meander-like conductive strip array, whose linear forward or backward extending meander sections each consist of a number of parallel conductor sections, may be produced by preform winding. In this case the meander-like conductive strip array preferably consists of a meander-shaped wire coil of cylindrical configuration.

In accordance with another aspect of the invention said meander-like conductive strip array may be a printed circuit and consists of a number of conductors which extend geometrically parallel to each other.

According to a further aspect of the invention it is provided in such an electronically commutated DC machine, whose linear forward or backward extending meander sections of the meander-like conductive strip array consist of a number of parallel conductor sections, the electronic control unit may be mounted on a circuit board about the rotary axis of the rotor within the meander-like conductive strip array. In such a case it is preferred to provide an annular circuit board.

In accordance with a further aspect of the invention said meander-like conductive strip array may consist of a plurality of electrically isolated meander-like wire coils of cylindrical configuration, said meander-like wire coils being composed of plural parallel windings in a single or multi-layer arrangement and being disposed within one another such that all of the linear, forward and backward extending meander sections are provided on a cylindrical circumference about a common cylinder axis, and overlapped portions exist merely in the region of the winding heads externally of the narrow, magnetically active annular gap.

In accordance with a further aspect of the invention it is provided that in such an electronically commutated DC machine, whose meander-like conductive strip array consists of one or plural meander-like wire coils, the permanent magnet of the rotor is a one-piece ring of U-shaped cross-section, and that the annular magnetic circuit member projects into the cavity enclosed by the permanent magnet, and said meander-like conductive strip array of cylindrical U-configuration is disposed inside the resulting U-shaped annular gap.

The high space factor of the particular meander-like stator winding and the low self-inductance thereof in conjunction with the high homogeneity of the lines of flux and the optimum arrangement of the linear, forward and backward extending meander sections composed of a number of parallel conductor sections completely within a narrow, magnetically active annular gap are the most significant reasons for the enhanced efficiency of the electronically commutated DC machine according to the invention.

An electronically commutated multi-pole DC motor having the structure known from the DE-OS No. 1,613,380 has not been realized and sold on a large scale up to now, which is evidently due to the low performance thereof. Conventional electronically commutated multi-pole DC motors having an even magnetic air gap normally exhibit low efficiency, because the interaction between permanent-magnet poles and the coils on the different radii will produce a non-optimum, i.e. radius-dependent e.m.f., whereas the DC motors configured in accordance with the invention have a significantly higher efficiency due to the optimum geometry and the high space factor.

An example of a DC motor having a structure according to the invention was equipped with a 40-pole permanent magnet of barium ferrite constituting the rotor. The meander-like conductive strip array consisted of a meander-like wire coil including 11 parallel conductor sections in single-layer arrangement for each forward or backward extending meander section. The circuit was designed for a rated speed of 3600 r.p.m. The speed variations about the circumference are independent of the load within the control range and in any case amount to less than 1/1000 of the rated speed. With a power consumption of about 4 W the efficiency of this motor is about 72%. Still higher efficiencies appear possible. Those skilled in the art will confirm that this is an excellent value for motors having these synchronization characteristics, which may be achieved only with electronic commutation; previous commercially available electronically commutated DC motors having these synchronization characteristics do not achieve this value.

Moreover, a DC motor having the configuration according to the invention supplies a high, uniform starting torque from any position of the rotor. Thanks to the high space factor of the stator winding in accordance with the invention, a smaller gap width than with conventional DC motors operating with permanent magnet excitation is made possible, which practically depends only on the manufacturing tolerances without the occurrence of magnetic restraint.

Furthermore, the structure according to the invention makes it possible to accommodate the electronic control unit within the annular space enclosed by the drive unit, whereby any interference radiation is prevented from escaping to the outside.

The linear forward and backward extending meander sections, which are interconnected via the winding heads, are preferably oriented in parallel to the axis of rotation of the rotor. These forward and backward extending meander sections form the active portions of the conductive strip array for producing the magnetic field to drive the rotor, when correspondingly contolled current flows through the conductor(s). The spacing between a linear forward extending meander section and the adjacent linear backward extending meander section corresponds to the spacing between the neutral zones of adjacent poles of the permanent magnet. Every linear forward or backward extending meander section consists of a number of mutually isolated conductor sections extending in parallel. Preferably, each forward or backward extending meander section per wiring layer may have such a number of conductor sections—in dependence on the conductor cross-sections—that the width of a linear forward or backward extending meander section is smaller than the pole width of the permanent magnets. In an especially preferred embodiment, the width of the meander sections does not exceed half the pole width. When a linear forward or backward extending meander section of another, electrically isolated meander coil is inserted into the gap between two adjacent forward and backward extending meander sections of a meander coil, the space factor may be further increased. In this way the narrow, magnetically effective annular gap may be filled almost completely with mutually isolated optimally arranged conductor sections, provided the non-contacting rotation of the permanent-magnet end faces of the rotor remains ensured.

Preferably, the length of the permanent-magnet poles only slightly exceeds the length of the linear forward or backward extending meander sections. The interconnected forward and backward extending meander sections, which are completely disposed in the multi-pole homogeneous magnetic field, are disposed along the circumference of a cylinder or truncated-cone portion in closely adjacent relationship at a distance from the orbit of the permanent-magnet pole end faces, so that there results an optimum conductive strip array to produce a magnetic field for driving the rotor when the flow of current through the conductor(s) is controlled accordingly.

Even with a relatively small rotor diameter and the use of conventional magnetic materials such as ferrites for the permanent-magnet rotor, the structure according to the invention also permits a significant increase in torque as compared to conventional electronically commutated DC motors, with an extremely high uniformity of the torque distribution about the circumference in dependence on the angle of rotation. Furthermore, by the multiple use of this structural principle it is possible to realize on one rotor a plurality of driving planes in a single plane of rotation about a common rotary axis. Such driving planes may be disposed with a mechanical-geometrical phase shift relative to one another, so that a further enhancement of the uniformity of torque will result. Finally, the torque supplied by the motor may additionally be influenced by means of the length of the permanent-magnet poles.

The high space factor, the optimum field distribution, and the preclusion of any magnetic restraint between rotor and stator unit result in a high torque, a high uniformity of torque distribution, and permit excellent constancy of the rated speed in the motor mode, Due to these properties the DC machine according to the invention, when used as a DC motor, is especially suitable for driving rotary storage media in the field of data processing, because it permits a higher information density on the storage media.

A further aspect of the invention therefore relates to the use of a DC machine in the form of an electronically commutated DC motor with the above-specified features for driving the spindle of such rotary storage media. The motor according to the invention is especially suitable for driving rotary storage media of the type which make maximum demands on the constancy of the speed of rotation and the precise arrangement of the disk turntable so as to provide for exact and fast access of the write/read head of the storage unit. Such demands occur particularly in hard-disk storages. The DC machine according to the invention, when used as a motor, is excellently suitable as a drive unit for such hard-disk storages. A disk storage, especially a Winchester disk storage, driven by a DC motor according to the invention enables a substantially higher data density of about ten times that of the presently possible data density.

Further advantageous embodiments and improvements of the invention will be apparent from the subclaims and/or from the following detailed description in conjunction with the drawings.

As has already been set out, the meander-like conductive strip array comprises as the active sections interconnected forward and backward extending meander sections of a number of parallel conductor sections. The array of these forward and backward extending meander sections along the circumference of a cylinder or a truncated-cone portion permits orientation of these forward and backward extending conductor sections in parallel with the rotary axis of the rotor. Preferably, the neutral zones between adjacent poles of the permanent magnet are also oriented in parallel to said rotary axis of the rotor, so that a number of linear conductor sections will result which are provided in an optimum arrangement for producing a magnetic field to drive the rotor. Thereby a high starting torque and a high efficiency are achieved.

According to an alternative embodiment, the forward and backward extending meander sections of the conductive strip array may extend at an angle to the neutral zones between adjacent poles of the permanent magnet. Thereby the starting characteristic of the motor may be influenced, and the torque distribution thereof about the circumference may be rendered still more uniform.

Adjacent forward and backward extending meander sections of the conductive strip array are connected to one another by means of a further conductive strip section. The resulting winding heads may be disposed completely within the magnetic air gap. Preferably, the winding heads extend outside of the magnetically active air gap along the extension of the annular gap. There result few strips with short paths across the head of the stator unit, so that small ohmic losses will result. The entire magnetically active annular gap is available for accommodating the stator winding, and any axial forces which might act on the motor bearings are avoided.

In an alternative embodiment, the winding heads may lead out of the geometrical extension of the annular gap. Such a structure is suitable for motors of small height which, though being of limited height, yet are intended to supply a high torque. In such a case it is possible, for instance, that the winding heads leading out of the annular gap extend at an angle, especially normal to the geometrical extension of the annular gap.

Preferably, a linear and parallel array of the forward and backward extending meander sections, which are interconnected through the winding heads, is realized completely within the magnetically active annular gap along the circumference of a cylinder or a truncated-cone portion. The circumference of such a meander-like conductive strip array with cylindrical configuration is matched to the cylindrical orbit of the permanent-magnet pole end faces in such a way that any mutual contact between conductor sections and pole faces is precluded while a minimized spacing therebetween is maintained. In the above-discussed electronically commutated multi-pole DC motor having the structure according to the invention, a magnetically active annular gap, i.e. the air gap between the surface of the magnetic circuit material and the orbit of the permanent-magnet pole end face, of about 300 micrometers has been realized.

The arrangement of the linear forward and backward extending meander section along the circumference of a truncated-cone portion is provided when the poles of the permanent magnet have their longitudinal axis oriented at an inclination to the rotary axis of the motor, so that the pole faces rotate on a truncated cone-shaped orbit. In such a case the angle between circumferential surface and longitudinal centre line of the truncated cone portion preferably should be less than 20°, especially preferably less than 15°, so as to ensure sufficient homogeneity of the distribution of flux lines of the permanent magnet.

Between the parallel forward and backward extending meander sections, preferably equal spacings are provided to result in a uniform pole pitch distributed over the circumference of the cylindrical or truncated cone-shaped array, said pole pitch corresponding to the pole pitch of the permanent magnet, i.e. either corresponding thereto or being integrally proportional thereto. It is especially preferred that the spacing between a linear forward extending meander section and the adjacent linear backward extending meander section corresponds to the pole width of the permanent magnet. In this way the pitch or number of poles about the annular circumference of the permanent magnet corresponds to the pitch of the forward and backward extending meander sections about the circumference of the cylindrical or truncated-cone portion. However, a corresponding number of poles and of forward and backward extending meander sections is not required. For instance, 36 forward and backward extending meander sections may be provided opposite 36 poles of a total of 40 permanent-magnet poles, and no forward and backward extending meander sections will exist opposite the remaining 4 permanent-magnet poles, because the corresponding space is utilized for magnetic field sensors and/or for terminations of the conductor terminals.

The length of the forward and backward extending meander sections shall be matched to the length of the permanent-magnet poles in order to ensure optimum driving torque. The length of the permanent-magnet poles is not particularly limited and may, in an extreme case, reach from a few millimeters to a few meters. For instance, for driving a window blind a blind driving motor in accordance with the constructional principle of the invention has been realized which with a diameter of merely about 6 cm has a pole length of 150 cm and more so as to be able to supply the high torque required for driving the window blind. Alternatively, for driving a clock or the like a DC motor according to the invention having a pole length of merely about 2 mm may suffice. For use as the driving unit of a Winchester disk storage, the DC motor according to the invention preferably has a pole length of between 4 and 24 mm, for instance a pole length of about 9 mm.

The number of linear, parallel, mutually isolated conductor sections per each forward or backward extending meander section is not especially limited and depends on various factors. At least two conductor sections should be provided for each meander section. A greater number of conductor sections is preferred in order to obtain a higher space factor. On the other hand, the width of a linear forward or backward extending meander section should not exceed the width of the permanent-magnet poles, because otherwise the total number of conductor sections of a meander section will always be exposed to the magnetic field of two opposite permanent-magnet poles whereby the efficiency would be reduced. The maximum number of conductor sections in one plane/layer per meander section is therefore selected in dependence on the conductor cross-section such that the width of a linear forward and backward extending meander section does not exceed the pole width of the permanent-magnet poles; preferably, the width of the meander sections is selected to be smaller than the pole width. When the width of the meander sections is selected to be not greater than half the pole width, it is possible with relatively little circuit and wiring expenditure to achieve a particularly high torque output. It is especially preferred to select the number of linear parallel, mutually isolated conductor sections per each plane/layer such that—in dependence on the conductor cross-sections—the width of a linear forward or backward extending meander section does not exceed half the pole width of the poles of the permanent magnet. For instance, with pole widths of 4 to 6 mm a meander-like conductive strip array has proven satisfactory whose linear forward or backward extending meander sections have a width of 2 to 3 mm and consist of 10 to 30 parallel conductor sections.

The meander-like conductive strip array consists of conventional electrically conductive materials preferably having a low ohmic resistance. Suitable conductor materials are, for instance, Cu, Al, Ag, Au, Pt and alloys thereof. An individual conductive strip may have any desired cross-section, for instance circular cross-section. Preferably, the conductive strip has angular, especially rectangular cross-section so that a particularly high space factor can be achieved. The conductive strip(s) may have such cross-sectional dimensions as to result, even without an additional support, in a stable, self-supporting conductive strip array in closely adjacent relationship to the orbit of the pole faces. Such a meander-like conductive strip array may for instance be produced by preform winding. The stability of a conductive strip produced by preform winding may be enhanced by post-impregnation with liquid, curable synthetic resin or by the use of so-called back-varnish wire (Back-Lack-Draht). Furthermore, the meander-like wire coil produced by preform winding may be secured to the circumference of the magnetic circuit member, for instance by means of an insulating adhesive.

Furthermore it is possible to obtain a suitable meander-like wire coil of cylindrical configuration by initially winding an endless wire to form a single or multilayer cylinder or flat coil, which is thereupon deformed to result in a meander coil of cylindrical configuration. For instance, it is possible initially to wind a single or multi-layer cylindrical coil which is thereupon deformed to result in a meander-like coil of cylindrical configuration. Deforming of the cylindrical coil may be performed by means of a number of first and second gripping elements which displace the cylindrical coil along a virtual tapering truncated-cone portion such that simultaneously the coil diameter is reduced and the linear forward and backward extending meander sections are formed. Alternatively, an annular flat coil may be wound, said annular flat coil may be deformed to result in a meander-like flat coil, and at least the linear forward and backward extending meander sections may be converted to cylindrical configuration. To bend the forward and backward extending meander sections, it is possible to use a tubular tool which places this section directly on the circumference of an annular magnetic circuit member. Thus an arrangement of the type shown in part in FIG. 9 may be obtained.

The meander sections of one or several further meander-like wire coils may be inserted into the spacings between adjacent meander sections of such a wire coil. Thereby the space factor in the magnetic air gap and thus the e.m.f. may be further enhanced. A meander-like conductive strip array of a plurality of electrically isolated meander-like wire coils of cylindrical configuration is obtained whose meander-like wire coils are composed of plural parallel windings in a single or multi-layer arrangement and are disposed within one another in such a way that all of the linear forward and backward extending meander sections are disposed on one cylinder periphery about a common cylinder axis, wherein overlaps occur only in the region of the winding heads externally of the magnetically active annular gap. Such a meander-like conductive strip array composed of at least two electrically isolated wire coils disposed within one another is preferred, because practically the entire space within the magnetically active annular gap may be filled with an optimum arrangement of conductor sections so as to produce a magnetic moment.

In such a case the width "b" of a forward or backward extending meander section of a wire coil may be equal to the gap width "c" between two adjacent meander sections of another wire coil. Said gap width "c" may be filled with a linear forward or backward extending meander section of said other, substantially analogous, electrically isolated meander-like wire coil, so that overlaps will result only in the region of the winding heads externally of the magnetically active annular gap. Such a meander-like wire coil arrangement including two wire coils disposed within one another is shown in part in FIG. 10.

Each meander-like wire coil may be of multi-layer structure and may, for instance, comprise up to 5 or 6 wire layers, with no change in the magnetic properties. However, it is preferred to provide a single-layer wire arrangement, because a high e.m.f. may be obtained in a narrow air gap.

If required, the above-explained meander-like wire coils may be provided on a substrate. It is also possible to mount the sensors for the electronic control system on such a substrate. Alternatively, the sensors may be mounted in recesses provided on the peripheral wall of the magnetic circuit member.

In accordance with a further aspect of the invention the meander-like conductive strip array provided in accordance with the invention, whose linear forward or backward extending meander sections consist of a number of parallel conductors, may be directly produced on a substrate. For instance, a so-called multi-layer array may be realized in which the conductive strip array is produced in a conventional way by etching and/or additive techniques or is built up by multi-wiring. Although the conductive strip has minimum cross-sectional dimensions, fixing of the meander-like conductive strip array on a substrate will ensure the required stability to establish a magnetic air gap which is as narrow as possible. The substrate may consist of conventional inert, electrically insulating substrate material; examples of such substrate materials are polyester films, Kapton films, flexible ceramic material, fibre reinforced plastics films, cloth made of glass fibre, of carbon fibre, of aramide fibre, and the like. The substrate material should have sufficient strength so as to permit a self-supporting arrangement of the conductive strip in closely spaced relationship to the orbit of the pole faces. Preferably, the substrate should have small thickness. In many cases it may be suitable to use a shrinkable substrate material (such as, for instance, selected polyimide films) so as to shrink the finished meander-like conductive strip array onto a magnetic circuit member. It is thereby possible to obtain a vibration-free arrangement of the stator winding on the magnetic circuit member.

Preferably, a meander-like conductive strip array consisting of a plurality of parallel conductors is provided on either side of the substrate. In such an arrangement at least one conductive strip array on one side of the substrate may be provided with an electromagnetic phase shift relative to at least one further conductive strip array on the other side of the substrate. A motor including such a phase-shifted arrangement of at least two separate conductors having current flowing therethrough will start from any position of the rotor with a clear direction of rotation. The electromagnetic phase shift between such separate conductive strip arrays on different sides of the substrate may, for instance, be 60°, 90° or 120°. Alternatively, it is also possible to provide the conductive strip arrays on opposite sides of the substrate in registry with one another. In the case of series connection, such a registering arrangement will supply a higher e.m.f. and may operate at twice the operating voltage.

Preferably, the conductive strip fixed onto a substrate may be a printed circuit. For the production of such a printed circuit the conventional techniques such as additive or subtractive production, sputtering, screen printing and the like are employed. The spacings between the individual parallel conductive strips are suitably minimized in order to achieve a high space factor. Examples of meander-like conductive strip arrays suitable as stator winding for the DC machine according to the invention have been produced by means of conventional etching techniques in the form of a printed circuit such as shown in FIGS. 7 and 8. In the illustrated examples each linear forward or backward extending meander section consists of 8 or 10 parallel conductive strips. The "gap width" between two adjacent forward and backward extending meander sections is reduced to a narrow gap in order to realize a high space factor. As illustrated, the winding heads which interconnect two adjacent forward and backward extending meander sections may have angular (FIG. 7) or round (FIG. 8) shape.

In accordance with a significant aspect of the present invention, the linear forward or backward extending meander sections of the meander-like conductive strip array consist of a number of parallel conductor sections which in case of manufacture as a printed circuit are formed of a number of geometrically parallel conductive strips. The starting and end portions of these conductive strips are connected either in parallel or in series, which depends on the particular application. A series connection of the conductive strips allows matching to rated voltages. By a parallel connection with the rated voltage being the same, the starting torque may be influenced, and at higher speeds of rotation the c.e.m.f. may be reduced.

When bonding adjacent ends of the conductive strips disposed on one side of a substrate, any enlargements facing towards the rotor must be avoided because this would result in an unnecessary widening of the magnetic air gap. Preferably, such ends of adjacent conductive strips that are to be interconnected are butt-welded. Alternatively, an overlapping arrangement of these ends may be provided, wherein the resulting enlargement is recessed either into the substrate material and/or into the region of the magnetic circuit member in engagement therewith.

In all these embodiments the meander-like conductive strip array may be fixed on the substrate by means of a coating agent which also electrically insulates the conductive strip array with respect to the magnetic circuit associated therewith or with respect to a further conductive strip array.

For producing such a meander-like conductive strip array disposed on a substrate, one proceeds appropriately from flat web or strip material. When the desired conductive strip configuration has been provided by means of conventional methods for producing a printed circuit, the flexible substrate material is closed to form a ring having the desired cylindrical or truncated cone-shaped pattern of the forward and backward extending meander sections. The initially flat sheet material, for instance with the printed meander-like conductive strip array shown in FIG. 7, may be closed to form a ring with a single-layer substrate arrangement. Alternatively, initially flat sheet material, for instance comprising the printed meander-like conductive strip array shown in FIG. 8, which includes an additional bonding region centrally between the starting and the final terminations, may be closed to form a ring with a dual-layer substrate arrangement. In order to ensure the desired specific conductive strip array and to cover the additional bonding points and/or strips, identifying marks are preferably provided on the substrate material. The diameter of such a ring is not specifically limited. For use as the driving unit in a Winchester storage, for instance, diameters of between 40 and 120 mm may be considered; preferably, diameters between about 60 and 90 mm are provided to this end. On the other hand, a DC motor according to the invention for use in automotive vehicles for directly driving the wheels may also have a diameter of 40 cm and more for the meander-like conductive strip array of cylindrical configuration.

It is also possible to provide on such a substrate, in addition to the conductive strip array, sensors for the detecting means. Such sensors for detecting the magnetic field of the permanent-magnet poles are devices based on Hall effects, Wiegand effects or opto-electronic effects. Furthermore, proximity switches may be used as sensors. Such sensors are arranged at precise electric angles with respect to the magnetic pole centres of all parallel forward and backward extending meander sections through which current flows, so that the commutation will take place when the magnetic flux crosses zero. Such arrangement at precise electric angles may be provided in neutral, advancing or lagging condition for commutation.

The sensors supply signals to the electronic control system for controlling the flow of current through the conductor(s) of the meander-like conductive strip array. It is possible to provide sensors for supplying analog signals, for instance in response to the rotary speed. Preferably, sensors are provided which supply digital signals in the form of square-wave pulses for the electronic control system. Apart from the commutation for the motor, a control signal for the speed control in response to load and voltage may be obtained from these square-wave pulses. Such a speed control may be performed especially through pulse width modulation. The electronic control system controls the flow of current through the conductor(s) so that a magnetic field for driving the rotor is produced thereby. For instance, this flow of current may be controlled by ON-OFF operation or by pole reversal. To this end the electronic control system may comprise a circuit in accordance with the U.S. Pat. No. 4,309,675.

In accordance with a further aspect of the invention said electronic control system is preferably mounted on a circuit board inside the DC machine; it is especially preferred to provide to this end an annular circuit board which is mounted in the annular space between the axis of rotation of the rotor and the stator unit. The result is excellent shielding of the electronic control system. In such a case it is preferred to provide such a geometrical arrangement of the terminals of the conductor(s) and/or the sensors of the detecting means as to permit direct connection of these terminals to the electronic control system, whereby long conductor paths to the electronic control system may be avoided.

An oscillator crystal may be provided on such a circuit board in the driving plane, said oscillator crystal together with active components producing a frequency by means of which—in the motor mode—the rotary speed of the DC machine may be stabilized. In order to allow the use of inexpensive clock crystals as control crystal having crystal frequencies of 32,768 Hz as reference standards, it is expedient to provide permanent-magnet rotors having a number of pole pieces corresponding to $\frac{1}{2}^n$, i.e. rotors having pole numbers of 51, 102 or 204 poles.

One of the necessary components of the DC machine according to the invention is a magnetic circuit or a return circuit member, respectively, for the magnetic field produced by the permanent magnet of the rotor and passing through the conductive strip array.

In contrast to known proposals, which provide for instance soft-iron for the magnetic circuit, the invention provides that the magnetic circuit is made of a material which in addition to a high permeability exhibits only small magnetic hysteresis losses, especially at the present high frequencies—in the multi-pole arrangement according to the invention commutating frequencies of up to several 100 kHz may occur. For the material, permeabilities of more than 40 to up to 10,000 and more $\mu$, preferably of 150 to 2,000$\mu$, are desirable. For instance, materials for such a stationary magnetic circuit may be sintered and/or pressed powder materials of high permeability and low electrical conductivity such as soft ferrites.

The magnetic circuit has annular configuration which is matched to the configuration of the conductive strip array. In order to ensure high torque and good efficiency, the conductive strip array should be disposed very close to such an annular return circuit member and in electrically insulated relationship thereto, so that in turn the poles of the permanent magnet may be closely adjacent the conductive strip array in order to obtain a magnetic air gap that is as narrow as possible. For the presently explained embodiment with a stationary magnetic circuit, the conductive strip array—for instance the conductive strip array provided on one side of a substrate—may be directly secured to the annular return circuit member with electrical insulation disposed therebetween. Depending on the design of the motor, the conductive strip array through which current flows may be provided only on the outer periphery of the annular return circuit member, or only on the inner periphery of the annular return circuit member, or on both the outer and the inner periphery thereof. It is also possible to associate a plurality of cylindrical or truncated cone-shaped conductive strip arrays with a plurality of magnetic annular return circuit members, so that a DC motor including a plurality of active driving planes in one rotary plane about a common axis will result.

In one embodiment, which will be explained in detail with reference to FIG. 1, the illustrated DC motor according to the invention includes a driving plane, and the meander-like conductive strip array of cylindrical configuration mounted on a substrate is secured on the outer periphery of an annular return circuit member with an electrical insulation disposed therebetween, said return circuit member in its turn being supported with its inner periphery by an annular housing portion of the motor. In this case the pole faces of the permanent magnet of the rotor rotate externally about the conductive strip array so that an external rotor-type motor is realized.

Preferably, the surface of the return circuit member facing the rotating poles of the permanent magnet is designed such that any magnetic restraint of these poles is precluded. To this end the surface of the return circuit member which faces the rotating poles of the permanent magnet may form a smooth surface, i.e. may be free from slots as well as from notches, depressions and the like, whereby manufacture and magnetization are facilitated and magnetic restraint is checked. Alternatively, slots might be formed in this surface of the return circuit member, said slots extending at an inclination to linear neutral zones of the permanent magnet (preferably in parallel to the rotary axis), or this surface of the return circuit member might be formed with slots which are oriented rectilinearly relative to obliquely extending neutral zones.

As an alternative to the above-explained embodiments with a stationary return circuit member, it is possible to provide at least one magnetic circuit for rotation about the rotary axis of the rotor. In the simplest case, such a rotatable magnetic circuit may consist of a further permanent magnet of the rotor which is arranged to be concentric with the other permanent magnet of the rotor and rotates in synchronism therewith. In this case the conductive strip array is disposed in the annular gap between two synchronously rotating permanent magnets, and each permanent magnet alternately functions as return circuit member for the respective other permanent magnet. Such an embodiment is explained below in detail with reference to FIG. 4.

The rotor of the DC motor according to the invention comprises one or plural permanent magnets whose poles are polarized substantially perpendicularly to the rotary axis. The permanent magnet of a rotor may be composed of plural segments disposed on an orbit that is concentric with the rotary axis of the rotor. Preferably, such a permanent magnet consists of a single closed ring.

In accordance with a further aspect of the invention the permanent magnet of the rotor may be an integral ring having U-shaped cross-section. The annular return circuit member projects into the hollow space enclosed by said U-shaped permanent magnet, and the meander-like conductive strip array with matched cylindrical U-configuration is disposed within the resulting U-shaped annular gap. Return circuit material may additionally be in engagement with the outside of the U-shaped permanent magnet. Such an arrangement is illustrated in part—in an exploded view—in FIG. 11. A DC machine in accordance with the invention including a U-shaped permanent magnet ring as the rotor and matched meander-like wire coil will supply a particularly high e.m.f., because a large elongated magnetic length is realized in a small structural space.

For producing the poles in a suitable permanent magnet, a permanently magnetized material of high coercivity is used. For instance, the permanent magnet may be made of powdery magnetic material homogeneously dispersed in a matrix of plastics material. Examples of magnetic materials are ferrites, especially strontium or barium ferrites as well as Sm/Co or Nd/Fe materials, selected rare-earth compounds and the like.

A suitable sector-shaped or annular permanent magnet is of laterally magnetized multi-pole structure and is preferably provided with return circuit material on the side remote from the conductive strip. To this end any desired soft-iron material may be used because no reverse magnetization will occur. Appropriately, a highly intimate connection between magnetic material and return circuit material should be observed. To this end the return circuit material may be placed into the mould provided for making the permanent magnet, and the permanently magnetizable thermoplastic material is sprayed or pressed thereon. Suitably, pulse magnetization is effected with the annular magnetic material provided with return circuit material before this unit is mounted in a housing, so that inductive magnetic hysteresis losses in the surrounding housing parts and field distortions will be prevented. Instead of the application of return circuit material it is also possible to provide an annular permanent magnet of greater pole depth.

Number and size of the poles of the permanent magnet are determined by the magnetizing conditions. The pole width of a single pole, i.e. the dimension thereof in circumferential direction of the annular permanent magnet, may be between about 0.3 mm and 30 mm; the higher values will be used particularly for high-performance motors, for instance in a linear drive system for automotive vehicles.

For motors which are used to drive rotary storage media in the field of data processing, pole widths of about 2 to 6 mm are preferably provided. The pole depth, i.e. the dimension in radial direction of an annular permanent magnet, depends on the magnetic material used; especially in case of magnetic materials of very high coercivity such as the Co/Sm materials a smaller pole depth may be sufficient. Preferably, an approximately square cross-section of a single pole with equal values of pole width and pole depth is provided. For a DC motor according to the invention, which is intended for instance as drive unit for a Winchester storage, a pole width and a pole depth of about 3.8 mm is respectively provided. As was already set out above, the length of the poles of the permanent magnet may vary widely and may, for instance, be between a few millimeters and a few meters.

The orientation of the polarization of the poles substantially perpendicularly to the rotary axis of the rotor permits the realization and optimum utilization of a high pole number with a relatively small rotor circumference. As will be apparent from the above remarks concerning the pole width, an annular permanent magnet having a diameter of about 4 cm may already comprise 40 and more poles.

A high number of poles is desirable within the scope of the instant invention in particular when uniformity of torque and constancy of the rotary speed of a motor are of importance. With a rotor having 32 and more poles, the deviation of the speed variation about the circumference may preferably be kept below 1/1000 when a corresponding electronic control system is used. When any magnetic restraint is additionally precluded due to the smooth, slotless cylinder wall of the return circuit member, such a motor produces practically no magnetic running noise (magnetostriction). On the other hand, the number of poles that can be obtained is by no means limited to the above-mentioned values. In accordance with the constructional principle of the invention DC motors have already been realized which have more than 200 poles, for instance 512 poles.

As already indicated above, a rotor may comprise a plurality of annular closed permanent magnets which are disposed on different-diameter orbits concentric with the axis of rotation, so that plural driving planes are realized in one plane of rotation about a common rotary axis. In this connection individual driving planes may be operated in the motor mode and one or plural further planes may be operated in the generator mode, for instance as tacho-generator. Merely one conductive strip array including one or plural electrically phase-shifted meander-type coils may be provided in the resulting annular gap between two synchronously rotating permanent magnets. In such a case each permanent magnet alternately functions as magnetic circuit for the respective other permanent magnet. Alternatively, a conductive strip array including one or plural meander-type coils may be associated with each permanent magnet in an annular gap of matched width, wherein the space between the conductive strip arrays is filled with a magnetic circuit which as a component part of the stator unit is stationary. According to a further modification, a rotating magnetic return circuit for the permanent magnets might also be disposed in the space between the two conductive strip arrays.

Based on a unit of volume, a DC motor according to the invention is capable of producing a particularly high torque. As compared to conventional DC motors, a multiple torque such as thrice the torque may be produced in the same unit of volume. When a suitable detecting means is used in combination with a corresponding electronic control system, it is possible to obtain an extremely high constancy of the rated speed of the motor; the deviations from the rated speed may, for instance, readily be kept below 1/1000. DC motors having these properties may be used in numerous applications. For instance, the DC motor according to the invention may be used to drive the rotary head and/or the tape of video recorders. Furthermore, servomotors for positional changes may be configured in accordance with the constructional principle according to the invention. The machine having the structure according to the invention may be used as tacho-generator in combination with control circuits. For such tacho-generators, permanent magnets having a very small pole depth and a small pole pitch may be provided so as to realize tacho-frequencies of from more than 300 Hz up to 100 kHz. Furthermore, a DC motor designed in accordance with the invention may be used as motor for record players. Moreover, DC motors of a design according to the invention may be considered as capstan drive means in tape recorders.

An especially preferred application relates to the use of a DC motor according to the invention as drive unit for driving rotary storage media in all fields of electronic signal processing, for instance in the field of data processing, entertainment electronics, and the like. For instance, the DC motor according to the invention may be provided as drive unit in floppy-disk storages. It is especially preferred to use the DC motor according to the invention as drive unit in the so-called Winchester disk storage, because it is possible to realize a multiple data density. In addition to high constancy of rotary speed and torque, this Winchester disk storage requires also a highly accurate adjustment of the disk supporting plane relative to the write/read heads.

To this end, the rotor of the DC motor according to the invention may be fixedly joined to a supporting flange whose flange plane is adapted to be adjusted to an accuracy of a few micrometers relative to a reference plane.

Frequently, the storage media of such storage systems are operated in a pressurized space so as to reliably preclude the ingress of possibly contaminated foreign gas, whereby contamination of the storage media is to be prevented. In known drive units the gas required to maintain the overpressure may escape via the rotor support structure.

In contrast thereto, a DC motor designed in accordance with the invention may be an internal rotor-type motor and may comprise a closed cup-like casing adapted to be fitted in pressure-tight fashion into a pressurized space of a disk storage. In such a case the rotor bearing will also be provided within the pressurized space, so that no additional bearing seals are necessary. Suitably, in such a case the motor components are also coated with a protective coating to prevent the escape of dust particles, whereby the flow of gas entering the motor casing cannot separate and entrain any dust particles.

BRIEF DESCRIPTION OF THE DRAWING

Below, the invention will be explained in detail with reference to preferred embodiments thereof and to the accompanying drawings, in which:

FIG. 4 is a schematic axial sectional view through a further embodiment of a motor according to the invention, the rotor including two adjacent annular permanent magnets;

FIGS. 5a and 5b are fragmentary views of further embodiments of motors according to the invention, in which a plurality of driving planes in a plane of rotation about a common axis have been realized;

FIG. 9 is a fragmentary view of a meander-like wire coil of cylindrical configuration, for use in a DC machine according to the invention;

FIG. 10 is a fragmentary view of a wire coil array of two meander-like wire coils of cylindrical configuration disposed in one another, for use in a DC machine according to the invention;

DESCRIPTION OF PREFERRED EMBODIMENTS

Figure 1:
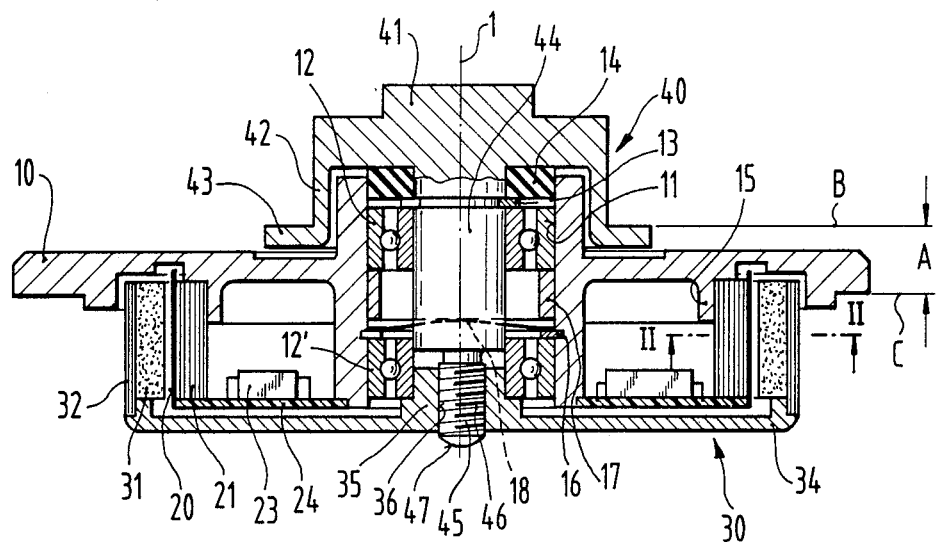
FIG. 1 is a schematic axial sectional view through a DC motor according to the invention, which is configured as external rotor-type motor.

FIG. 1 illustrates a DC motor according to the invention, in which the rotor 30 is journalled for rotation about an axis of rotation 1. This motor comprises a base plate 10 on which the essential motor components are mounted. This base plate 10 may be made of reinforced plastics material or of non-magnetic metallic material such as aluminium. A sleeve 11 is integrally formed with the inner periphery of the substantially annular base plate 10, the bearings for the shaft of the rotor 30 being inserted into the bore of said sleeve. These bearings may, for instance, be ball bearings or plain bearings. In the embodiment illustrated, two axially spaced ball bearings 12 and 12' are provided. The upper ball bearing 12 is in abutting relationship with a locking collar 13 inserted in an annular groove formed on the outer periphery of the rotor shaft. Thereby the upper ball bearing 12 is restricted relative to axial movement thereof. On top of the locking collar 13 a sealing member 14 is provided which prevents escape of even the most minute dust particles.

The magnetic circuit of the stator assembly is in engagement about the outer periphery of an annular flange 15 depending in axial direction from the base plate 10. In the illustrated embodiment this magnetic circuit consists of an annular member 21 of soft ferrite. The meander-like conductive strip array 20 is in engagement with the smooth outer periphery of the ring with electrical insulation disposed therebetween. An electronic control system 23 is mounted on an annular circuit board 24 within the annular space inside the conductive strip array 20 and in direct contact therewith. The electronic control system 23 may be supplied with current and voltage for operation of the motor via a feed line (not illustrated). Sensors (not illustrated) are furthermore provided for detecting the position of the magnetic field of the rotor relative to the stator assembly and for supplying corresponding signals to the electronic control system 23.

The pole faces of the permanent magnet 31 of the rotor 30 rotate in closely adjacent spaced relationship to the forward and backward extending meander sections of the meander-like conductive strip array of cylindrical configuration. In the illustrated embodiment this permanent magnet 31 is annular and is made of powdery magnetic material dispersed in a cured matrix of plastics material. The inner periphery of the annular permanent magnet 31 has a smooth surface. On the outer periphery of the annular permanent magnet 31, magnetic return circuit material in the form of a soft-iron ring 32 is provided. A cylindrical extension disposed in concentric relationship with the axis of rotation 1 projects inwardly from the inside of the rotor housing 34 to form the shaft section 35 of the rotor. A shoulder is recessed on the outer periphery of said rotor shaft section 35, and by means of said shoulder the rotor shaft section is firmly in engagement on the rotatably supported inner race of the lower ball bearing 12'. The stationary outer periphery of said lower ball bearing 12' engages the bore of the sleeve 11 of the base plate 10 and is retained against axial movement relative to the sleeve 11 by means of a locking collar 16 which is inserted into an annular groove formed on the inner periphery of the sleeve 11. A concentric internal thread 36—which is continuous in the illustrated embodiment—is cut from the solid material of the rotor shaft section 35. In an alternative embodiment, the internal thread 36 proceeding from the inside could be non-continuous and could terminate before the rotor housing.

A substantially hat-shaped plate top 40 comprises a cover plate 41 having a cylindrical wall portion 42 extending therefrom concentrically with the axis of rotation, said wall portion 42 terminating in a radially extending flange portion 43. The top of the flange portion 43 defines the plane "B" of the plate top. The inner periphery of the cylindrical wall portion 42 is retained in closely spaced rotatable relationship with the outer periphery of the sleeve 11. A centrally disposed shaft portion 44 of the plate top 40 projects inwardly from the cover plate 41. The outer periphery of said shaft portion 44 of the plate top is in engagement with the rotatably retained inner race of the upper ball bearing 12 and with the rotatably retained inner race of the lower ball bearing 12'. The upper ball bearing 12 and the lower ball bearing 12' have an annular spacer member 17 disposed therebetween which is in engagement with the top of an ondular washer 18 having its bottom supported by the locking collar 16. A centrally disposed bolt 45 having external threads 46 depends from the end face of the shaft portion 44 of the plate top. This threaded bolt is adapted to be threaded into the internal thread 36 on the rotor shaft portion 35 and includes a spherically rounded end portion 47. For grounding of the rotor, said crowned end portion 47 may engage a grounded contact spring (not illustrated).

Figure 2:
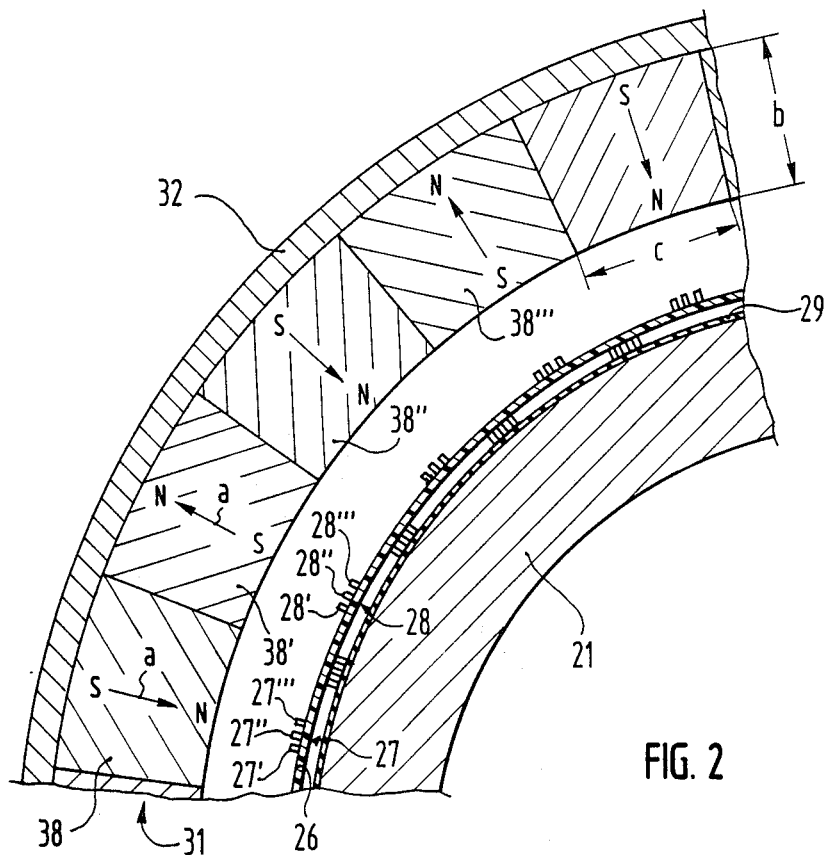
FIG. 2 is a schematic cross-sectional view along the line II—II of FIG. 1, illustrating the relative association between the rotor and the stator unit in the motor shown in FIG. 1.

The bolt 45 is threaded into the internal thread 36 of the rotor shaft portion 35 until the ondular washer 18 is mechanically tensioned. By adjusting the turning force relative to the ondular washer 18, the distance "A" between the plane "B" of the plate top and a reference plane "C" defined by the base plate 10 may be set with high precision. In the presently described embodiment, the distance "A" could be adjusted to an accuracy of a few micrometers. When the desired setting has been made, the bolt 45 is locked against movement relative to the internal thread 36, for instance by means of an adhesive. When the rotor housing 34 and the plate top 40 are made of aluminium or another metallic material such as "Zamak", an adhesive such as "Loctite" may be used. Below, the mutual relationship between the permanent magnet of the rotor and the conductive strip of the stator will be explained with reference to FIG. 2 for the DC motor shown in FIG. 1. FIG. 2 shows schematically a cross-section along the line II—II of FIG. 1. For reasons of greater clarity, only an approximately 90°-segment of the complete annular assembly has been illustrated.

As viewed from the outside to the inside, the outer wall of the annular permanent magnet 31 is directly adjacent the inner wall of the soft-iron ring 32. The individual pole pieces 38, 38', 38", 38'" etc. of the annular permanent magnet 31 are remagnetized alternatingly in radial direction, i.e. normal to the axis of rotation, which is indicated schematically by means of the orientation of the arrows "a". In the illustrated embodiment, the depth "b" of the pole pieces—i.e. the pole piece dimension in radial direction—corresponds substantially to the width "c" of the pole pieces, i.e. the pole piece dimension in axial direction.

A substrate 26 of a printed circuit is disposed in closely spaced stationary relationship (the spacing is enlarged in FIG. 2 for reasons of greater clarity) to the inner surface of the annular permanent magnet 31. On the outside of the substrate three respective parallel conductors 27', 27" and 27'" of a backward extending meander section 27 of the meander-like conductive strip array are disposed. In spaced relationship thereto, three respective parallel conductors 28', 28", 28'" of a forward extending meander section 28 of the conductive strip array extend on the outside of the substrate 26.

Corresponding backward and forward extending meander sections of a number of parallel conductors are provided in electromagnetically offset relationship on the inside of the substrate and are in direct engagement—separated by electrical insulation 29—with the outer surface of a soft-ferrite ring 21 which constitutes the magnetic circuit for the permanent magnetic field passing through the conductive strip array.

Figure 3:
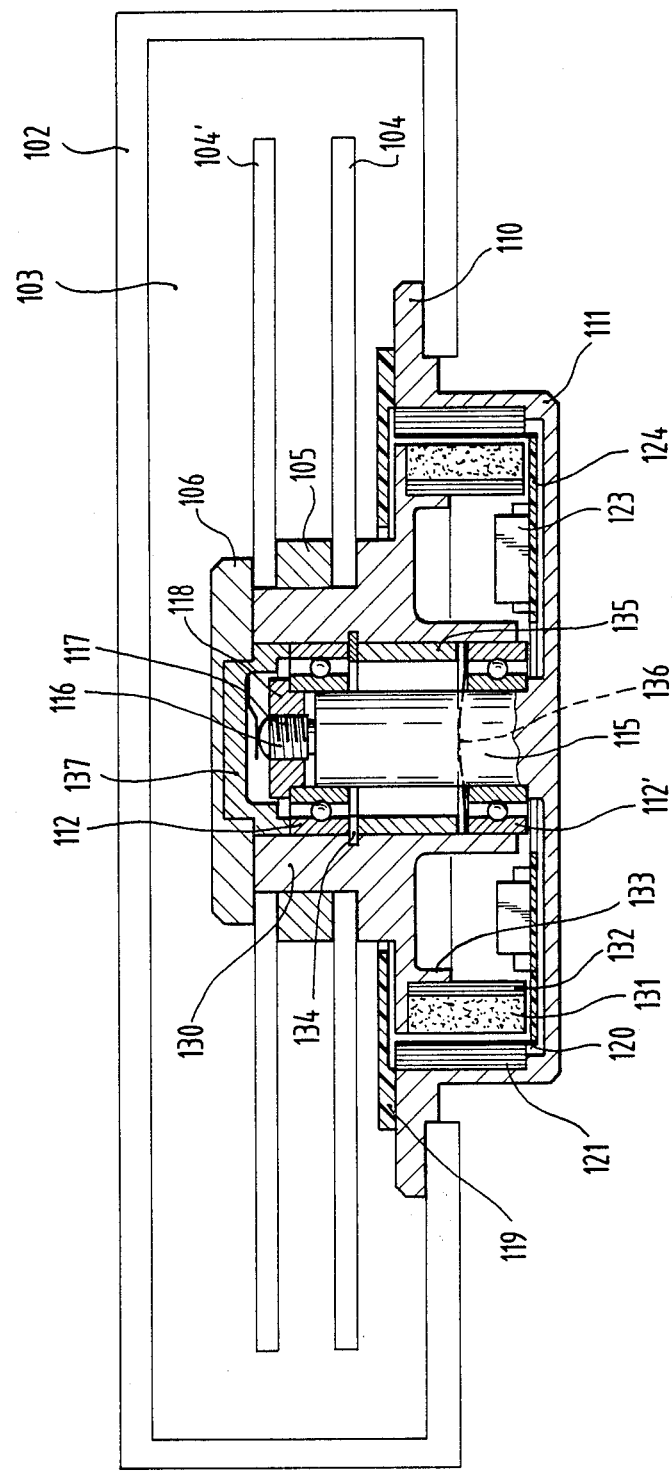
FIG. 3 is a schematic axial sectional view through a further embodiment of a motor according to the invention configured as internal rotor-type motor, which is mounted in pressure-tight fashion in the pressurized space of a storage unit.

FIG. 3 shows a further embodiment of a DC motor in accordance with the invention. This motor comprises substantially the same components as the motor according to FIG. 1; however, with respect to the latter, rotor and stator have been exchanged. In the motor shown in FIG. 3, the annular permanent magnet of the rotor rotates within a concentric cylindrical conductive strip array which is in turn supported on the motor casing (internal rotor-type motor).

In detail, the motor shown in FIG. 3 comprises a cup-shaped motor casing 111 having an annular flange 110 radially extending from the casing edge. By means of this annular flange 110 the motor may be mounted in pressure-tight fashion in a circular recess of a housing 102 which surrounds a pressurized space 103. If required, a sealing member (not shown) may be provided in the sealing area. Inside of said pressurized space the rotating recording media 104 and 104' driven by the motor are provided, said media being separated from each other by an annular spacer member 105. A cover plate 106 urges said recording media 104 and 104' into a step-like recess on the outer periphery of the rotor body 130.

The inner surface of the cylindrical portion of the motor casing 111 is engaged by the magnetic circuit for the magnetic field of the rotating permanent magnet, said magnetic field passing through the meander-like conductive strip array 120. In the embodiment illustrated, said magnetic circuit is formed by a magnetic ring 121 of soft ferrite material. A narrow gap separates the conductive strip array 120 from the pole faces of the rotating annular permanent magnet 131. Along its inner periphery the annular permanent magnet 131 is supported by a soft-iron ring 132, which in its turn is fixedly mounted on an axially projecting annular flange 133 of the rotor body 130. Within the annular space enclosed by the conductive strip array 120 there is disposed the electronic control system 123 which is mounted on an annular circuit board 124 which in its turn is supported on the inside of the bottom of the motor casing 111. By means of feed lines (not illustrated) the electronic control system 123 is supplied with current and voltage for driving the motor. In the free space beneath the permanent magnet 131 the circuit board 124 extends right to the cylindrical conductive strip array 120 to enable direct connection to the wiring leading to the electronic control system 123.

From the bottom of the motor casing 111 a pin 115 integrally formed with said casing 111 extends centrally inwardly in axial direction, the retained inner races of the bearings 112 and 112' being in engagement with the outer periphery of said pin. The end portion of the pin 115 is stepped to result in a central extension 116 having external threads 117 cut into the outer surface thereof. The crowned end of the extension 116 is engaged by a contact spring for grounding the rotor.

The inner surface of the substantially sleeve-like rotor body 130 is engaged by the rotatably retained outer races of the bearings 112 and 112'. The inner surface of the rotor body 130 is provided with an annular groove having a locking collar 134 inserted therein, which supports the upper bearing 112 against axial displacement relative to the rotor body 130. The inner surface of the rotor body 130 is engaged by an annular spacer member 135 having its top supported against the underside of the locking collar 134 and having its bottom supported by the upper surface of an annular ondular washer 136. The underside of this ondular washer 135 engages the top of the rotatably mounted outer race of the lower bearing 112'. The fixed inner race of this lower bearing 112' is seated in a shoulder formed on the pin 115 of the motor casing 111.

An internally threaded member 118 may be threaded onto the external threads 117 of the pin extension 116. A recessed portion of the outer periphery of said threaded member 118 is in engagement with the fixed inner race of the upper bearing 112. Through tightening of the threaded member 118 it is again possible to establish with a high degree of accuracy the axial arrangement of the rotor body 130 relative to the motor casing 111.

When the threaded joint between threaded member 118 and pin extension 116 has been secured, the central opening of the rotor body 130 is closed by means of a cap 137.

With the described embodiment of a DC motor according to the invention the bearings 112 and 112', which rotatably support the rotor 130 and thus also the plate top, are disposed within the pressurized space 103 so that a seal for the bearings is not required. The working gap between the permanent magnet 131 on the rotor 130 and the conductive strip array 120, which is fixedly mounted on the motor casing 111, is covered by a barrier member 119 disposed on the top of the annular flange 110. This barrier member 119 prevents escape of dust particles from the motor into the pressurized space 103. Additionally, it may be appropriate with this embodiment to cover all of the components of the motor with a protective coating to prevent separation and escape of dust particles. The embodiment of a DC motor according to the invention as illustrated in FIG. 4 is configured substantially analogously to the motor of FIG. 1, the difference being that the stationary magnetic circuit provided in the motor of FIG. 1 has been replaced by a further annular permanent magnet mounted on the rotor.

More in detail, the stationary cylindrical conductive strip array 220 is disposed in the working gap between two annular permanent magnets 231 and 233. The soft-iron ring 232 engages the periphery of the outer permanent magnet 231. The inner surface of the inner permanent magnet 233, which is concentric with the outer permanent magnet 231, engages a soft-iron ring 234. In this case each of the permanent magnets 231 and 233 alternately acts as magnetic circuit for the permanent magnetic field of the respective other permanent magnet crossing the conductive strip array 220.

With reference to FIGS. 5a and 5b, different alternatives are schematically indicated for implementing a motor according to the invention with plural driving planes in a rotational plane about a common axis of rotation. The motor shown in FIG. 5a comprises three annular permanent magnets 331, 332 and 333 arranged concentrically to each other in a common plane and being fixed on a rotor 330. In the working gap between the permanent magnets 331 and 332 there is provided the first meander-like conductive strip array 320. In the working gap between the permanent magnets 332 and 333 there is provided the second cylindrical meander-like conductive strip array 321. The permanent magnet 331 serves as magnetic circuit for the magnetic field generated by the permanent magnet 332 and crossing the conductive strip array 320. On the side of the permanent magnet 331 remote from the conductive strip array 320 the magnet is provided with a soft-iron ring 335. In the same way the permanent magnet 333 serves as magnetic circuit for the magnetic field generated by the permanent magnet 332 and crossing the conductive strip array 321. On the side of the permanent magnet 333 remote from the conductive strip array 321, the permanent magnet is provided with a soft-iron ring 334. By corresponding control of the conductive strip arrays 320 and 321 two driving planes are established with this motor.

The embodiment shown in FIG. 5b also provides two driving planes. FIG. 5b is a fragment of an embodiment of a motor according to the invention substantially configured in accordance with the motor of FIG. 1. In addition to the motor of FIG. 1 and distinctive therefrom, a second permanent magnet fixed to the rotor is provided. Within the annular gap between the two permanent magnets a stationary magnetic circuit is provided.

More in detail, two permanent magnets 431 and 433 are secured in concentric relationship on the rotor 430 of the motor of FIG. 5b in one rotational plane. An annular gap between these two permanent magnets 431 and 433 is sufficiently dimensioned so that a magnetic circuit in the form of a soft-ferrite ring 421 fixedly mounted on the motor base plate 410 may be disposed therein, said ring 421 being provided on the inside and on the outside thereof with a cylindrical meander-like conductive strip array 420 and 423, respectively. Thus, the first conductive strip array 420 is in the first working gap between permanent magnet 431 and stationary magnetic circuit 421. The second conductive strip array 423 is in the second working gap between the other permanent magnet 433 and the stationary magnetic circuit 421. On the side remote from the working gap the permanent magnet 431 is provided with a soft-iron ring 432. Likewise, the side of the permanent magnet 433 remote from the second working gap is provided with a soft-iron ring 434.

Figure 6:
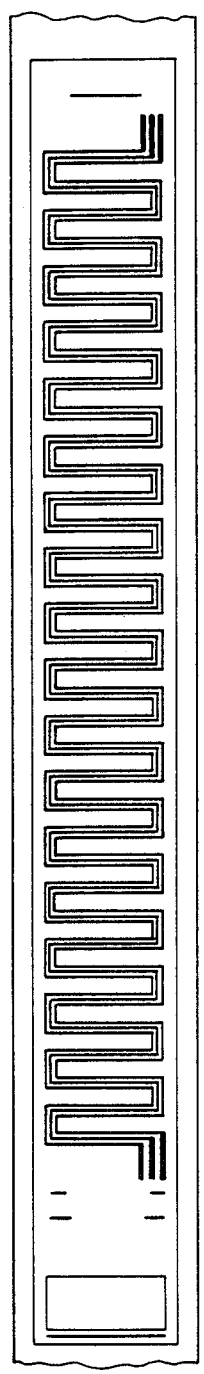
FIG. 6 is a schematic view of flat sheet material including a printed circuit, for producing a meander-like conductive strip array of cylindrical configuration which is suitable in accordance with the invention.

FIG. 6 illustrates flat sheet or tape material for producing a cylindrical meander-like conductive strip array for a DC motor according to the invention. Each side of the substrate material, which has been initially coated on either side with a thin copper film, has been provided by usual etching techniques with a meander-like conductive strip array. As will be apparent, each conductive strip array comprises three parallel conductive strips each having a starting and an end terminal. The long, relatively opposite sections of the conductive strips constitute the interconnected forward and backward extending meander sections of the conductive strip array. Additionally, marks have been provided laterally of the conductive strip array. The relatively aligned orientation of these marks after the flat tape or sheet material has been closed to form a ring will ensure the desired predetermined configuration of the conductive strip array.

Figure 7:
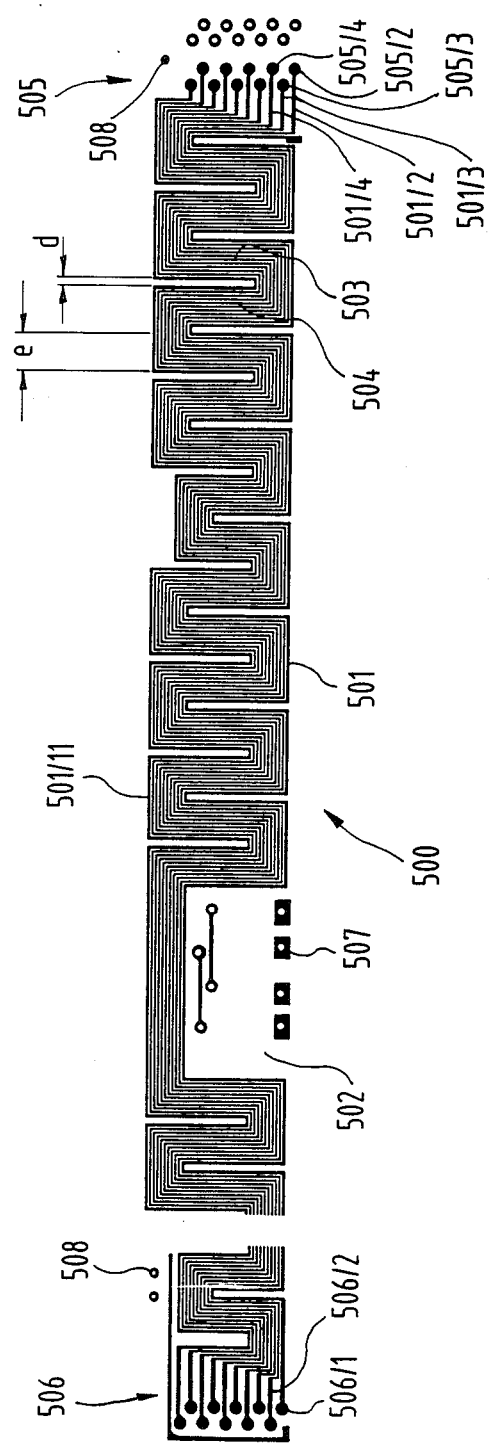
FIGS. 7 and 8 illustrate practical embodiments of meander-like conductive strip arrays produced as printed circuit for use in a DC machine according to the invention.

FIG. 7 illustrates—in a fragmentary view—a practical embodiment of a meander-like conductive strip array implemented as a printed circuit for use as stator winding in a DC machine according to the invention. This conductive strip array 500 comprises 11 meander-like conductive strips 501 extending in geometrically parallel relationship on a substrate surface 502, said conductive strips having been produced by etching away the remaining coating. The gap width "d" between two adjacent forward or backward extending meander sections 503 and 504 is comparatively small relative to the width "e" of the meander sections, so that a large amount of magnetically active conductor material may be accommodated on the substrate surface. Each of the 11 conductive strips 501 starts in an enlarged starting portion 505 and ends in an enlarged end portion 506. For instance, the "second" conductive strip 501/2 starts at the starting portion "No. 2" and ends at the end portion "No. 1". After production of the annular magnetic circuit the initial portions 505 of the conductive strip will overlie the end portions 506 of the conductive strip. More in detail, the end portion "No. 1" will overlie the starting portion "No. 3" of the third conductive strip 501/3, the end portion "No. 2" will overlie the starting portion "No. 4" of the fourth conductive strip 501/4, etc. The superposed end portions 506 and starting portions 505 are contacted through the substrate material, whereby all of the conductive strips 501 to 501/11 of the meander-like conductive strip array 500 will be electrically connected in series.

On the back of the substrate 502 there is provided an identical meander-like conductive strip array (not illustrated) which is, however, electrically offset by 90°. On the substrate there are furthermore provided at a defined spacing from the magnetic centre position of the forward and backward extending meander sections 503 and 504 the sensors 507 for sensing the respective instantaneous position of the permanent-magnet poles relative to the forward and backward extending meander sections 503 and 504. Marking elements 508 ensure during the etching operation the mutually correct orientation of the meander-like conductive strip array 500 on the front surface of the substrate 502 relative to the corresponding, but electrically phase-shifted, meander-like conductive strip array provided on the back of the substrate 502.

Figure 8:
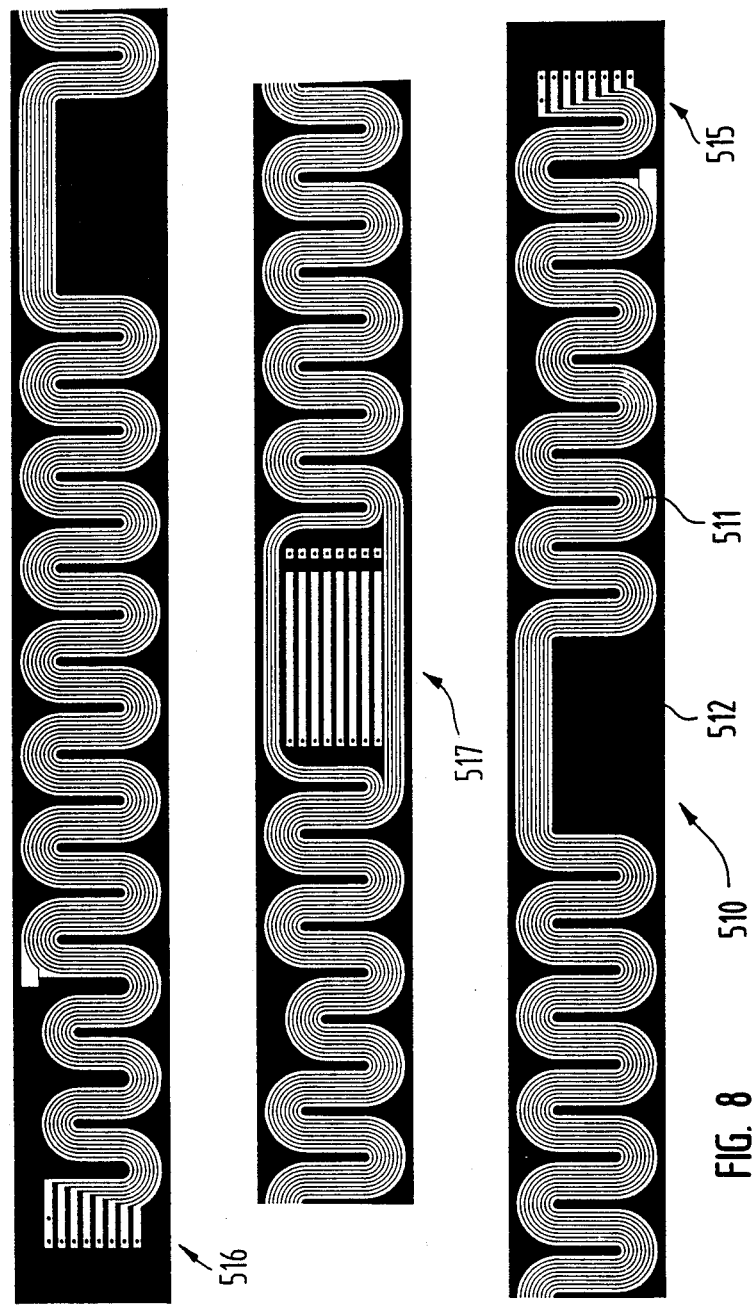

FIG. 8 shows a substantially analogously constructed meander-like conductive strip array 510 obtained by etching. The difference resides in that the conductive strip array 510 has round winding heads 511, and—the scale being the same—it would have more than twice the length of the conductive strip array 500 shown in FIG. 7. The front surface of the substrate 512 is provided with the conductive strip array 510, and the back of the substrate is provided with an identical further conductive strip array (not illustrated) which is disposed at an electrical phase offset. Both conductive strip arrays are covered by an insulating layer, for instance by cured insulating varnish or an additional film.

The array shown in FIG. 8 is intended for producing a stator winding with a dual-layer arrangement of the substrate 512. Contacting of the starting portions 515 and the end portions 516 through the substrate material is effected via the centrally provided contacting bridges 517.

FIG. 9 shows a fragment of a meander-like wire coil 540 of cylindrical configuration for use as stator winding in a DC machine according to the invention. As shown, the linear, parallel, forward and backward extending meander sections 542 and 543 of the finished meander coil 540 of cylindrical configuration are provided on the periphery of an annular return circuit member 545. The winding heads 539 and 544 are bent and are disposed outside of the cylinder configuration. For reasons of clarity only a few geometrically parallel conductive strips are shown. A meander-like wire coil having the structure shown in FIG. 9, which is suitable for practical use, might comprise 10 to 20 parallel conductor turns in one wire layer. The finished meander coil may comprise a single or multi-layer wire array.

For manufacture, one may proceed from an annular, single or multi-layer flat coil having the desired number of parallel wire turns and deform said annular flat coil to a meander-like flat coil. Subsequently, the inner winding heads 539 on the end face of the annular return circuit member 545 are secured adjacent the edge thereof, and the linear forward and backward extending meander sections 542 and 543 are thereupon bent by means of a hollow-cylindrical male die member and are placed in the cylindrical configuration on the periphery of the return circuit member 545. The lower winding heads 544 may thereupon be bent as required either inwardly (towards the rotary axis of the rotor) or outwardly to thereby save structural height.

FIG. 10 shows in a fragmentary view a wire coil array 550 suitable as stator winding for a DC machine according to the invention, comprising two relatively nested, but electrically isolated meander coils 551 and 555. A respective meander section 552 of the one meander coil 551 is disposed on the same cylinder periphery within the gap between two adjacent forward and backward extending meander sections 556, 557 of the other meander coil 555. Preferably, the width "b" of the meander section 552 corresponds to the gap width "c" between the two other meander sections 556, 557, so that practically the entire cylinder circumference may be covered with wire. The winding heads 554, 558 are bent out of the cylindrical configuration so that the required crossings will not occur in the region of the cylinder circumference. It is possible with a comparatively simple electronic control system to achieve exact commutation of the two electrically isolated wire coils 551 and 555 for producing a magnetic field to drive the rotor. Again, for reasons of clarity only a few parallel conductor windings have been illustrated; a practical embodiment of such a wire coil array may comprise, for instance, 10 to 20 parallel wire turns in a single-layer array.

The two wire coils 551 and 555 are produced separately. For instance, it is possible to this end to proceed from a single or multi-layer cylindrical coil having the desired number of parallel turns. Generally, the cylindrical coil initially produced on a cylinder periphery is gripped by first and second gripping members and is displaced along a virtual tapering frusto-conical section such that simultaneously the coil diameter is reduced and the linear forward and backward extending meander sections of the meander coils 551 and 555 are produced. During implementation with a suitable winding machine, such displacement takes place along the central cross-sectional plane of the cylindrical coil.

Figure 11:
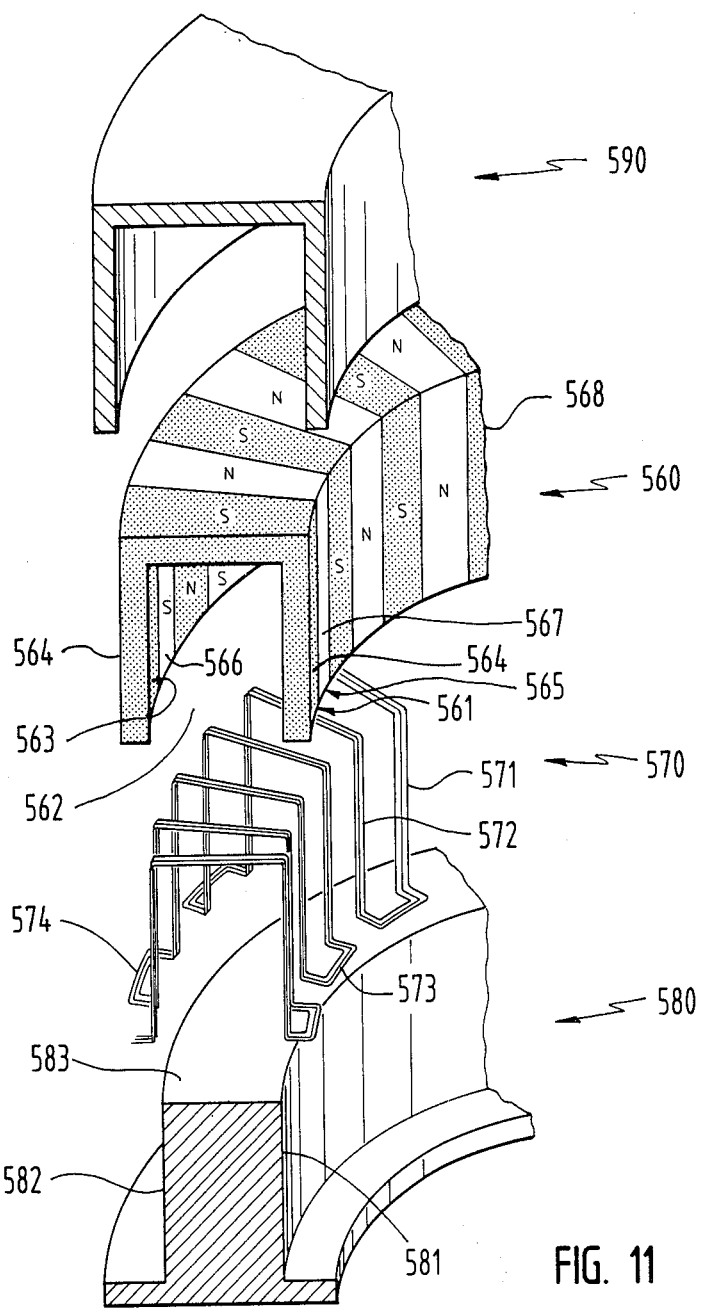
FIG. 11 is a fragmentary exploded view of a U-shaped annular multi-pole permanent magnet with a matched meander-like wire coil and matched internal and external return circuit members.

FIG. 11 shows a fragmentary exploded view of an annular multi-pole permanent magnet 560 of U-shaped cross-section, a correspondingly matched meander-like wire coil 570 and matched inner and outer return circuit members 580 and 590.

The annular permanent magnet 560 of U-shaped cross-section is of laterally magnetized multi-pole configuration; i.e. with a given U-shaped magnet section 561 the inner side 563 enclosing the U-shaped hollow space 562 constitutes the north pole, and the opposite outer side 564 constitutes the south pole. In the succeeding magnet section 565 the inner side 566 constitutes the north pole and the opposite outer side 567 constitutes the south pole; etc. Return circuit material in the form of a U-shaped ring 590 of appropriate dimensions may be in engagement with the outside 568 of the U-shaped permanent-magnet ring 560. Since no reverse magnetization will take place there, said return circuit member 590 may be made of common soft-iron. The meander-like wire coil 570 includes matched cylindrical U-configuration, so that it may be inserted in the hollow space 562 enclosed by the U-shaped permanent-magnet ring 560 and may be disposed at a minimum distance from the rotating permanent-magnet ring 560. Preferably, the winding heads 573 and 574 are bent and are disposed in parallel spaced relationship to the corresponding pole face. Inside the U-shaped meander coil there is provided a ring 580 of high-permeability return circuit material. In practical use, the meander coil 570 will initially be secured in vibration-free fashion on the inner and the outer periphery of the return circuit member 580, whereupon this assembly is disposed in non-contacting fashion inside the hollow space 562 enclosed by the permanent-magnet ring 560.

For manufacturing the meander-like wire coil 570 of U-shaped cylindrical configuration, it is possible for instance to proceed from a meander-like flat coil including sufficiently long meander sections. The meander sections are centrally disposed on the end face 583 of the inner return circuit member 580. The portions of the meander sections which protrude beyond the wall thickness on either side are thereupon bent with the aid of a suitable annular die member of U-shaped cross-section and are brought into engagement with the inner periphery 581 and the outer periphery 582 of the return circuit member 580. There results a U-shaped meander coil 570 of substantially cylindrical configuration whose forward and backward extending meander sections 571 and 572 are in engagement with the inner periphery 581, with the end face 583, and with the outer periphery 582 of the return circuit member 580. The winding heads 573 and 574 may thereupon be bent out of the cylindrical configuration in order to save structural space.

Figure 12:
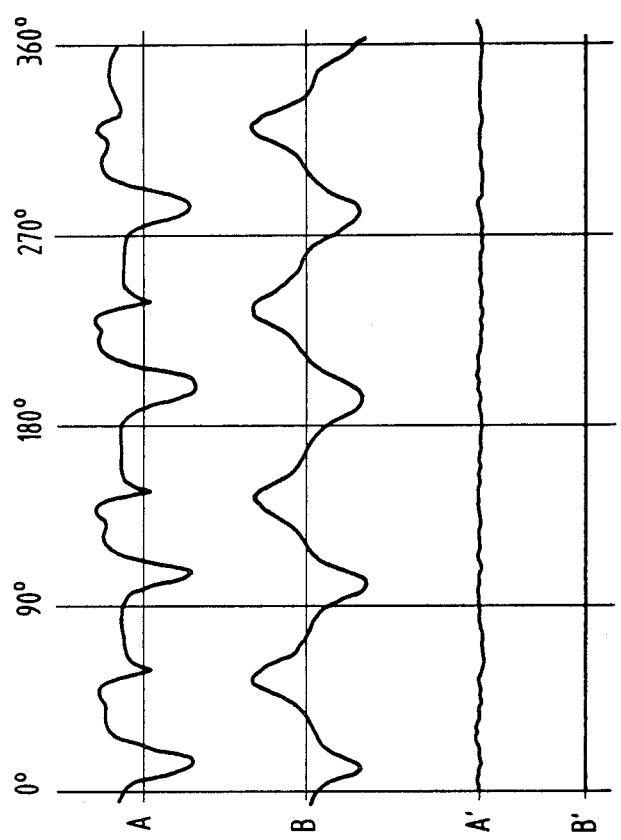
FIG. 12 illustrates by means of graphs a comparison between the uniformity of torque distribution in a motor according to the invention and a conventional DC motor.

FIG. 12 is a graph illustrating along the ordinate the amount of the angle-dependent torque variations for one revolution of the motor about 360° (along the abscissa). More in detail, curve A indicates the stationary moment of a conventional motor. Curve B indicates the reluctance moment of the same conventional motor. Curve A' indicates the stationary moment, and curve B' indicates the reluctance moment of a DC motor according to the invention with 40 pole pieces.

I claim:

1. An electronically commutated DC machine comprising a rotor having at least one permanent magnet with at least four poles adjacent an annular return circuit member, said poles being disposed concentrically to the rotary axis of the rotor and being polarized substantially perpendicularly thereto, at least one stationary meander-like conductive strip array in an annular gap between the rotor and the return circuit member, said strip array including linear forward and backward extending meander sections and being produced by preform winding such that at least one of the linear forward and backward extending meander sections comprises a number of parallel conductor sections, at least some of which are connected in series per linear meander sections, means for detecting the angular position of the rotor relative to one of the linear forward and backward extending meander sections of the conductive strip array, and an electronic control system for controlling on the basis of signals produced by the detecting means the flow of current through the conductive strip array such that the conductive strip array produces a magnetic field to drive the rotor, said electronic control system being mounted on a generally annular circuit board about the rotary axis of the rotor within the meander-like conductive strip array.

2. The DC machine of claim 1 wherein at least one conductor section forming the meander-like strip array has an angular conductor cross-section.

3. The DC machine of claim 2 wherein the conductor section has a rectangular conductor cross-section.

4. The DC machine of claim 1 wherein the meander-like conductive strip array is disposed on a substrate.

5. The DC machine of claim 4 wherein the meander-like strip array is fixed on the substrate by means of a coating agent which electrically isolates the conductive strip array relative to the annular return circuit member.

6. The DC machine of claim 4 wherein the detecting means include sensors disposed on the substrate.

7. The DC machine of claim 6 wherein the sensors are disposed at precise angles relative to the magnetic pole centers of the linear forward and backward extending meander sections through which current flows so that commutation is formed when the magnetic flux crosses zero.

8. The DC machine of claim 4 wherein the meander-like strip array is fixed on the substrate by means of a coating agent which electronically isolates the conductive strip array relative to a further conductive strip array.

9. The DC machine of claim 6 wherein the sensors supply square wave shaped digital signals for the electronic control system.

10. The DC machine of claim 1 wherein the linear forward and backward extending meander sections of the meander-like conductive strip array extend at an angle to a neutral zone between adjacent poles of the permanent magnet.

11. The DC machine of claim 1 wherein the width of at least one of the forward linear and backward extending meander sections is smaller than the pole width of the permanent-magnet poles.

12. The DC machine of claim 11 wherein the width of one of the linear forward and backward extending meander sections is not larger than one half of the pole width.

13. The DC machine of claim 1 wherein the DC machine is capable of operating in a motor mode and wherein an oscillator crystal is provided on the circuit board, said oscillator crystal together with active components producing a frequency which in the motor mode is used to stabilize the rotary speed of the DC machine.

14. The DC machine of claim 1 wherein the geometrical arrangement of the terminal contacts of the conductor sections forming the meander-like strip array permits direct connection to the electronic control system.

15. The DC machine of claim 1 wherein the annular return circuit member is stationary and wherein on the surface thereof facing the rotor an electrically-insulated, meander-like conductive strip array is in engagement therewith.

16. The DC machine of claim 1 wherein the rotor comprises a plurality of permanent magnets disposed on orbits that are concentric with the rotary axis of the rotor.

17. The DC machine of claim 16 wherein in the annular gap between two rotating permanent magnets there is provided at least one meander-like conductive strip array and wherein each permanent magnet alternatively functions as magnetic circuit for the respective other permanent magnet.

18. The DC machine of claim 1 wherein the permanent magnet of the rotor is an integral ring of U-shaped cross-section, wherein the annular return circuit member protrudes into the hollow space enclosed by the permanent magnet, and wherein a meander-like conductive strip array of cylindrical U-configuration is provided within the resulting U-shaped annular gap between the rotor and the return circuit member.

19. The DC machine of claim 1 wherein the rotor is fixedly joined to a supporting flange whose flange plane is adjustable to an accuracy of a few micrometers relative to a reference plane.

20. The DC machine of claim 1 wherein the machine is an internal rotor-type DC motor and further comprises a closed cup-shaped housing adapted to be inserted in a pressure-tight fashion into a pressurized space.

21. The DC machine of claim 1 wherein said meander-like conductive strip array comprises a plurality of electrically insulated meander-like wire coils of cylindrical configuration, said meander-like wire coils including a plurality of parallel turns in an array having at least a single layer and being disposed within each other such that all of the linear forward and backward extending meander sections are disposed on a cylinder periphery about a common cylinder axis and overlaps merely occur in the region of the winding heads outside of the magnetically active annular gap.

22. The DC machine of claim 21 wherein at least two meander-like wire coils are disposed within one another and wherein the width of one of the linear forward and backward extending meander sections of one wire coil corresponds substantially to the gap width between two adjacent forward and backward extending meander sections of the other wire coil.

23. The DC machine of claim 1 wherein said meander-like conductive strip array comprises wire coils and wherein the wire coils comprise a single-layer wire array.

24. The D.C machine of claim 1 wherein the detecting means includes sensors and wherein the geometrical arrangement of the sensors permits direct connection to the electronic control system.

25. An electronically commutated DC machine comprising a rotor having at least one permanent magnet with at least four poles adjacent an annular return circuit member, said poles being disposed concentrically to the rotary axis of the rotor and being polarized substantially perpendicularly thereto, at least one stationary meander-like conductive strip array in an annular gap between the rotor and the return circuit member, the strip array including linear forward and backward extending meander sections and at least one of the linear forward and backward extending meander sections comprising a number of parallel conductor sections, means for detecting the angular position of the rotor relative to the linear forward and backward extending meander sections of the conductive strip array, and an electronic control system for controlling on the basis of signals produced by the detecting means the flow of current through the conductive strip array such that the conductive strip array produces a magnetic field to drive the rotor, said electronic control system being mounted on a generally annular circuit board about the rotary axis of the rotor within the meander-like conductive strip array.

26. The DC machine of claim 25 wherein the meander-like conductive strip array has been produced by preform winding.

27. The DC machine of claim 25 wherein the meander-like conductive strip array includes wire coils and wherein the wire coils comprise a single-layer wire array.

* * * * *